United States Patent
Schnabel, Jr.

(10) Patent No.: US 11,230,487 B2
(45) Date of Patent: Jan. 25, 2022

(54) GLASS PROCESSING SYSTEM WITH VARIABLE BENDING STATION

(71) Applicant: GLASSTECH, INC., Perrysburg, OH (US)

(72) Inventor: James P. Schnabel, Jr., Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 276 days.

(21) Appl. No.: 16/361,361

(22) Filed: Mar. 22, 2019

(65) Prior Publication Data

US 2020/0299176 A1    Sep. 24, 2020

(51) Int. Cl.
| | |
|---|---|
| C03B 23/03 | (2006.01) |
| C03B 23/035 | (2006.01) |
| C03B 27/00 | (2006.01) |
| C03B 35/20 | (2006.01) |

(52) U.S. Cl.
CPC .......... *C03B 23/0307* (2013.01); *C03B 23/03* (2013.01); *C03B 23/0302* (2013.01); *C03B 23/035* (2013.01); *C03B 27/00* (2013.01); *C03B 35/202* (2013.01); *C03B 2225/02* (2013.01)

(58) Field of Classification Search
None
See application file for complete search history.

(56) References Cited

U.S. PATENT DOCUMENTS

| | | |
|---|---|---|
| 3,806,312 A | 4/1974 | McMaster et al. |
| 3,934,970 A | 1/1976 | McMaster et al. |
| 3,947,242 A | 3/1976 | McMaster et al. |
| 3,994,711 A | 11/1976 | McMaster |
| 4,518,411 A | 5/1985 | Frank et al. |
| 4,838,920 A | 6/1989 | Blasquez-Gonzales et al. |
| 4,859,225 A | 8/1989 | Kuster et al. |
| 5,122,177 A | 6/1992 | Yoshizawa et al. |
| 5,900,034 A | 5/1999 | Mumford et al. |

(Continued)

FOREIGN PATENT DOCUMENTS

WO    2018/220394 A1    12/2018

OTHER PUBLICATIONS

PCT International Search Report and Written Opinion dated Jun. 2, 2020, Application No. PCT/US20/23497, Applicant Glasstech, Inc., 11 Pages.

(Continued)

*Primary Examiner* — Erin Snelting
(74) *Attorney, Agent, or Firm* — Brooks Kushman P.C.

(57) ABSTRACT

A glass processing may include a heating station to heat glass sheets, and a bending station disposed downstream of the heating station to bend the heated glass sheets. The bending station may include first and second independent movement mechanisms configured to independently move first and second molds when the glass processing system is operated in a first mode, and to cooperate to move a third mold when the glass processing system is operated in a second mode. The system further includes a control system to control the movement mechanisms so that they operate independently when the glass processing system is operated in the first mode, and so that they operate simultaneously when the glass processing system is operated in the second mode.

31 Claims, 7 Drawing Sheets

(56) References Cited

U.S. PATENT DOCUMENTS

| | | | |
|---|---|---|---|
| 6,425,269 B1 * | 7/2002 | McMaster | C03B 23/0307 65/106 |
| 7,958,750 B2 | 6/2011 | Vild et al. | |
| 9,452,948 B2 | 9/2016 | Nitschke et al. | |

OTHER PUBLICATIONS

PCT International Preliminary Report on Patentability dated Sep. 28, 2021, Application No. PCT/US2020/023497, Applicant Glasstech, Inc. 8 Pages.

* cited by examiner

GLASS PROCESSING SYSTEM WITH VARIABLE BENDING STATION

TECHNICAL FIELD

The disclosure relates to glass processing systems for bending glass sheets.

BACKGROUND

Prior systems for processing glass sheets are disclosed in U.S. Pat. Nos. 7,958,750 and 9,452,948.

SUMMARY

A glass processing system according to the disclosure may include a heating station to heat glass sheets, and a bending station disposed downstream of the heating station to bend the heated glass sheets. The bending station may include first and second independent movement mechanisms configured to independently move first and second molds when the glass processing system is operated in a first mode, and to cooperate to move a third mold when the glass processing system is operated in a second mode. The system further includes a control system to control the movement mechanisms so that they operate independently when the glass processing system is operated in the first mode, and so that they operate simultaneously when the glass processing system is operated in the second mode.

A glass processing system according to at least one embodiment of the disclosure may include a heating station to heat glass sheets, and a bending station disposed downstream of the heating station to bend the heated glass sheets. The bending station may include a movement arrangement configured to independently move first and second molds when the glass processing system is operated in a first mode, and to move a third mold when the glass processing system is operated in a second mode. The system further includes a controller to control the movement arrangement to independently move the first and second molds when the glass processing system is operated in the first mode, and to move the third mold when the glass processing system is operated in the second mode.

A method is also provided for processing glass sheets using a glass processing system having a bending station with first and second movement mechanisms. The method may include operating the glass processing system in a first mode in which the bending station includes first and second molds connected to the first and second movement mechanisms, respectively, and operating the glass processing system in a second mode in which the bending station includes a third mold connected to the first and second movement mechanisms. The first mode includes operating the movement mechanisms independently to independently move the first and second molds, and the second mode includes operating the movement mechanisms simultaneously to move the third mold.

While exemplary embodiments are illustrated and disclosed, such disclosure should not be construed to limit the claims. It is anticipated that various modifications and alternative designs may be made without departing from the scope of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
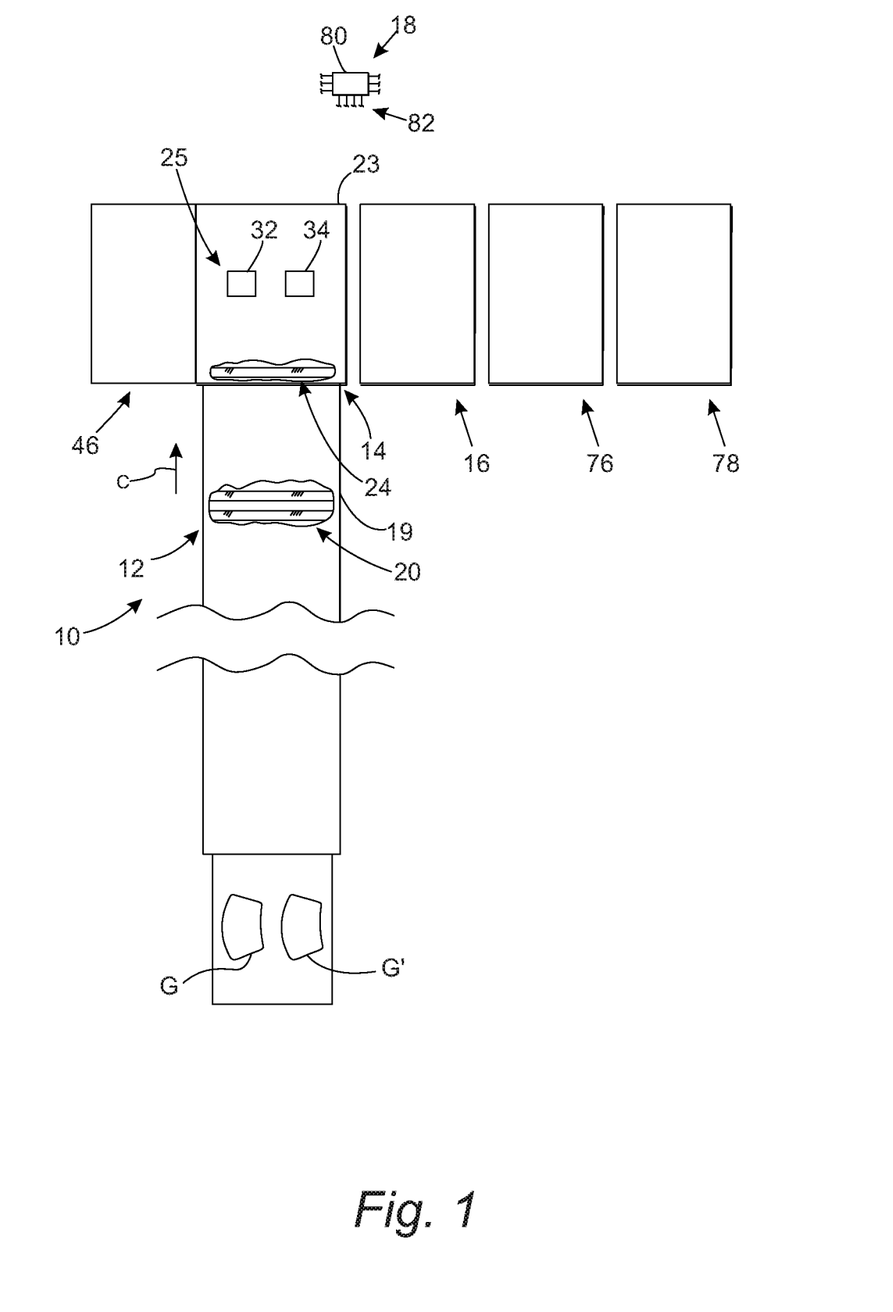
FIG. 1 is a schematic top view of a glass processing system according to the disclosure, including a heating station for heating the glass sheets, a forming or bending station for forming or bending each heated glass sheet into a desired shape, a cooling station configured to cool each glass sheet, and a control system for controlling operation of the heating station, the bending station and the cooling station.

Referring to FIG. 1, a glass processing system 10 is shown for processing glass sheets G, G'. The system 10 includes a heating apparatus or station, such as a furnace 12, for heating the glass sheets G, G'; a forming or bending station 14 for forming or bending each heated glass sheet G, G' into a desired shape; a cooling station, such as an annealing station or a quench station 16, configured to cool each glass sheet G, G'; and a control system 18 for controlling operation of the furnace 12, the bending station 14 and the quench station 16. As explained below in detail, the glass processing system 10 is configured to operate in at least first and second modes, and the bending station 14 is advantageously configured to operate with different tools or molds for performing different molding or bending operations depending on the mode of operation.

The furnace 12 may have any suitable configuration for heating the glass sheets G, G'. For example, the furnace 12 may include a housing 19 with any suitable heating elements (not shown) positioned above and/or below a conveyor arrangement or conveyor system 20 (housing 19 is broken away in FIG. 1 to show two rolls or rollers of conveyor system 20, which may extend the entire length of the furnace 12), which may be used to convey the glass sheets G, G' along a horizontal plane of conveyance C through the furnace 12. As a more detailed example, the heating elements may include radiant heating elements, such as electric heaters, and/or convective heating elements, such as hot gas or hot air distributors. The conveyor system 20 may be a roller conveyor type including rollers like those disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al., which are hereby incorporated by reference.

The bending station 14 is disposed downstream of the furnace 12, and includes a housing 23 for receiving on or more tools or molds for performing bending operations as explained below in further detail. As shown in FIG. 1, the housing 23 of the bending station 14 is offset with respect to the housing 19 of the furnace 12, and is wider (e.g. at least 12 or 15 inches wider) than the housing 19 to accommodate various tools or molds, as explained below in further detail. The bending station 14 further includes a conveyor arrangement or conveyor system 24, which may be a separate conveyor system or part of the conveyor system 20, for receiving heated glass sheets G, G' from the furnace 12 and for conveying the heated glass sheets G, G' along the horizontal plane of conveyance C within the bending station 14. The housing 23 is broken away in FIG. 1 to show a roll or roller of the conveyor system 24, which may extend from the furnace 12 to a downstream edge of any tools or molds received in the bending station 14. In addition, the bending station 14 includes a movement arrangement, such as a lift arrangement 25, for moving one or more tools or molds during a particular bending operation associated with a particular mode of operation. For example, the first mode of operation mentioned above may include a multistage (e.g., three stage) bending operation, and the second mode of operation mentioned above may include a single stage bending operation.

Figure 2:
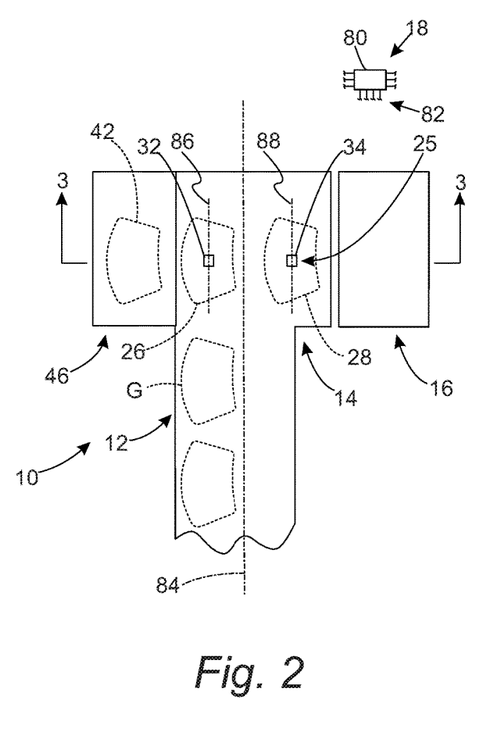
FIG. 2 is a schematic top view of the glass processing system of FIG. 1 shown in a first operating mode in which the bending station includes first and second upper molds.
Figure 3:
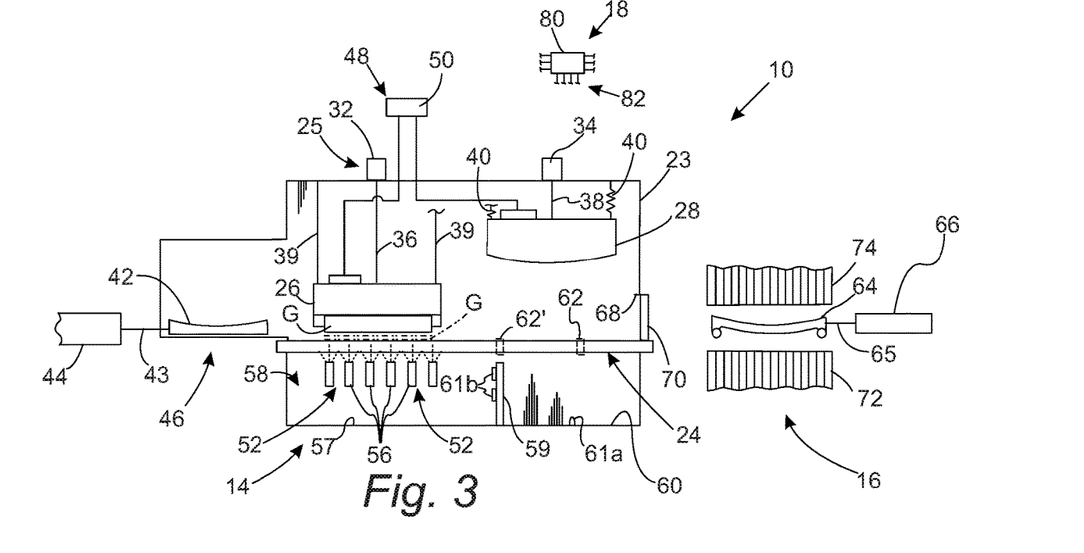
FIG. 3 is a schematic view of the glass processing system of FIG. 2 taken along line 3-3 and viewed in the direction of the arrows, wherein the first upper mold is shown in a lowered position to receive a glass sheet from a conveyor system of the bending station, and the second upper mold is shown in a raised position.
Figure 7:
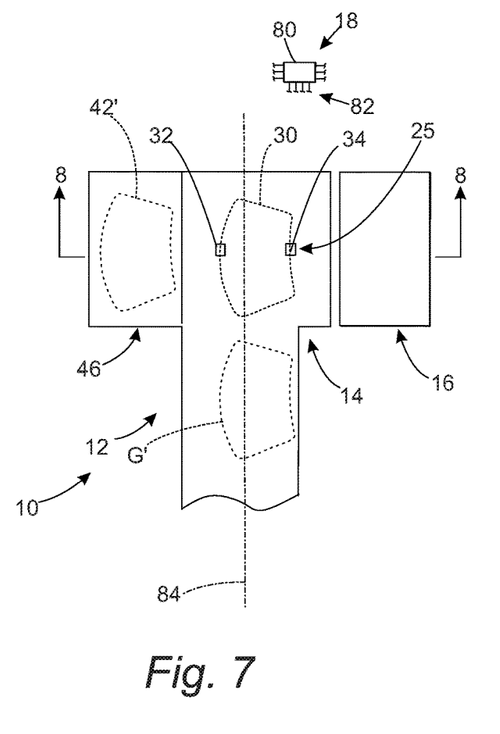
FIG. 7 is a schematic top view of the glass processing system of FIG. 1 shown in a second operating mode in which the bending station includes a single upper mold, which may be referred to as a third upper mold.
Figure 8:
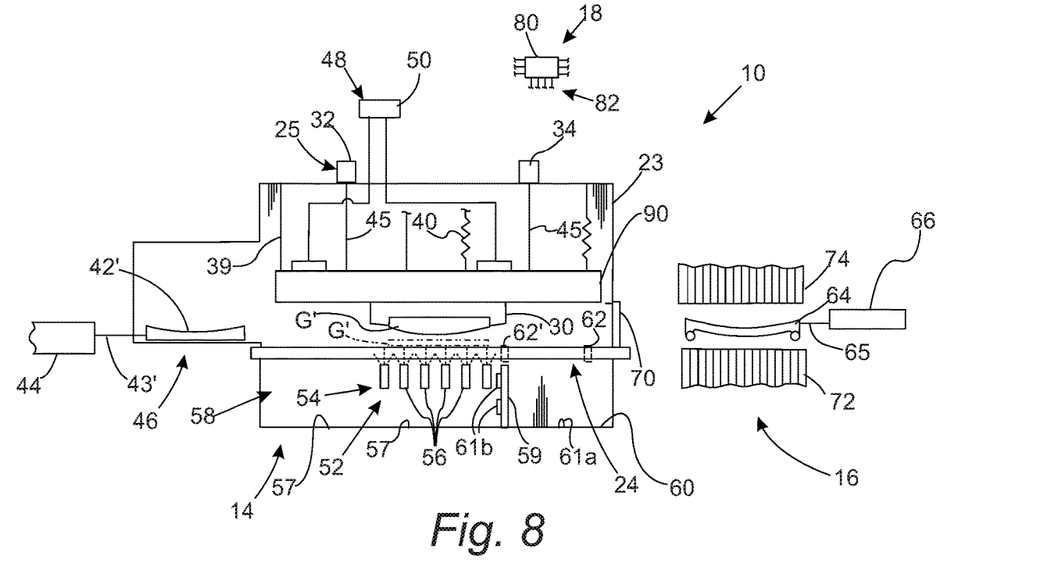
FIG. 8 is a schematic view of the glass processing system of FIG. 7 taken along line 8-8 and viewed in the direction of the arrows, wherein the third upper mold is shown in a lowered position to receive a glass sheet from the conveyor system of the bending station.

Referring to FIGS. 2 and 3, the first mode of operation may involve use of first and second molds, 26 and 28, respectively, in the bending station 14, and the lift arrangement 25 may be configured to independently move (e.g., raise and/or lower) the first and second molds in that first mode. Referring to FIGS. 7 and 8, the second mode of operation may involve use of a single mold, such as a third mold 30, in the bending station 14, and the lift arrangement 25 may be configured to move (e.g., raise and lower) the third mold 30 in the second mode of operation.

Returning to FIG. 3, the lift arrangement 25 of the bending station 14 may include first and second independent movement mechanisms, such as first and second lift mechanisms 32 and 34, respectively, that are configured to independently move (e.g., lift and/or lower) the first and second molds 26 and 28, respectively, when the glass processing system 10 is operated in the first mode. Referring to FIG. 8, the first and second lift mechanisms 32 and 34, respectively, may cooperate to move (e.g., lift) the third mold 30 when the glass processing system 10 is operated in the second mode. The lift mechanisms 32 and 34 may each be any suitable lift mechanism, such as an actuator. Furthermore, the control system 18 may be configured to control the lift mechanisms 32 and 34 so that they operate independently when the glass processing system 10 is operated in the first mode, and so that they operate simultaneously when the glass processing system 10 is operated in the second mode.

Referring to FIG. 3, when the glass processing system 10 is operated in the first mode, the first and second molds 26 and 28, respectively, may be first and second upper molds, respectively, that are connected to the first and second lift mechanisms 32 and 34, respectively, with first and second connections or drive members 36 and 38, respectively. In the illustrated embodiment, the first mold 26 is mounted on one or more first supports 39 so that the first mold 26 is laterally fixed, and the second mold 28 is mounted on one or more second supports 40 that allow the second mold 28 to move laterally. For example, the first supports 39 may be rigid guides, such as posts or rods, that guide vertical movement of the first mold 26 and inhibit lateral movement of the first mold 26. By contrast, the second supports 40 may be configured to sway to allow lateral movement of the second mold 28. For example, the second supports 40 may each include a flexible member (e.g., chain, cable, strap, etc.) or other movable member. The connection 38 between the second mold 28 and the second lift mechanism 34 may likewise be flexible to allow lateral movement of the second mold 28.

When operated in the first mode, the glass processing system 10 may further comprise a lower mold, such as a press ring 42, mounted on a movable mold support, such as a press ring shuttle or support 43, and positionable beneath the first and second molds 26 and 28, respectively. The press ring support 43 is further connected to an actuator 44 that is operable to move the press ring support 43 and the press ring 42 into and out of the housing 23 of the bending station 14. In the illustrated embodiment, the press ring 42 is unlockable, releasable or detachable (e.g., un-clampable) from and/or movable (e.g., slidable) with respect to the press ring support 43 to allow alignment of the press ring 42 with the first mold 26 when the press ring 42 is positioned beneath the first mold 26 and the first mold 26 is moved toward the press ring 42. Furthermore, the press ring 42 is configured to be fixedly attached or locked (e.g., clamped) to the press ring support 43 when the press ring 42 is positioned beneath the second mold 28 and the second mold 28 is movable laterally to align with the press ring 42. For example, the press ring 42 and/or press ring support 43 may include one or more suitable locking devices, such as pivotable locks or clamps, that are actuatable (e.g., by an electric actuator) for securing the press ring 42 to the press ring support 43, and which are unlockable or releasable to allow movement of the press ring 42 with respect to the press ring support 43. Example actuatable locking or clamping devices are disclosed in U.S. Pat. No. 5,900,034, which is hereby incorporated by reference in its entirety. Furthermore, additional details of suitable configurations and other details of the first and second molds 26 and 28, respectively, and the press ring 42 may be found in U.S. Pat. No. 9,452,948, which is hereby incorporated by reference in its entirety.

Referring to FIG. 8, when the glass processing system 10 is operated in the second mode, the third mold 30 may be an upper mold that is attached to both of the lift mechanisms 32 and 34 with connections or drive members 45. Furthermore, as mentioned above, the control system 18 may control operation of the lift mechanisms 32 and 34 so that they operate simultaneously to move the third mold 30 upwardly or downwardly.

Likewise, when operated in the second mode, the glass processing system 10 may further comprise a lower mold, such as a press ring 42', mounted on a movable mold support, such as a press ring shuttle or support 43', and positionable beneath the third mold 30. The press ring 42' may be the same as or different than the press ring 42 and/or the press ring support 43' may be the same as or different than the press ring support 43, depending on the configuration of the molds and/or the glass sheets to be processed. Furthermore, the glass processing system 10 may include a heated area, such as a hot station or box 46, connected to the bending station 14 and configured to receive the press ring 42 or 42' when the press ring is not positioned in the bending station 14 in order to keep the press ring at an elevated temperature.

In addition, referring to FIGS. 3 and 8, the bending station 14 may include a vacuum system 48 in communication with the control system 18 and configured to cooperate with the molds 26, 28 and 30 to draw heated glass sheets G, G' off of the conveyor system 24 or other component and against one or more of the molds and/or to retain heated glass sheets against the molds 26, 28 and 30. For example, when the bending station 14 is being operated in the first mode, a vacuum source 50 of the vacuum system 48 may be in fluid communication with the first mold 26, and the control system 18 may be configured to control the vacuum system 48 to draw a glass sheet G upwardly from the conveyor system 24 and toward a mold surface of the first mold 26 and/or to hold the glass sheet G against the mold surface of the first mold 26, by drawing air through holes formed in the mold surface of the first mold 26. Likewise, when the bending station 14 is being operated in the second mode, the vacuum source 50 may be in fluid communication with the third mold 30, and the control system 18 may be configured to control the vacuum system 48 to draw a glass sheet G' upwardly from the conveyor system 24 and toward a mold surface of the third mold 30 and/or to hold the glass sheet G' against the mold surface of the third mold 30, by drawing air through holes formed in the mold surface of the third mold 30.

The bending station 14 may further include a lift device or system 52 having a gas lift jet array 54 positioned beneath the conveyor system 24 and configured to facilitate lifting of glass sheets G, G' off of the conveyor system 24 and toward or against one or more of the molds. For example, when the bending station 14 is being operated in the first mode, the lift jet array 54 may be positioned proximate a left side or edge of the bending station 14 and configured to provide pressurized gas (e.g., air) jets through multiple, spaced apart lift jet outlets or gas jet outlets 56, such as nozzles, spouts, or pumps, for lifting glass sheet G upwardly from the conveyor system 24 and toward the first mold 26. Likewise, when the bending station 14 is being operated in the second mode, the lift jet array 54 may be positioned proximate a central portion of the bending station 14 and configured to provide pressurized gas jets for lifting glass sheet G' upwardly from the conveyor system 24 and toward the third mold 30.

The lift system 52 may be the primary system or mechanism for transferring glass sheets from the conveyor system 24 to one of the molds 26 or 30, and the vacuum system 48 may then function to hold each glass sheet against a particular mold. In another embodiment, the vacuum system 48 may be the primary system or mechanism for transferring glass sheets from the conveyor system 24 to one of the molds 26 or 30, and for also holding each glass sheet against a particular mold.

The lift system 52 may be the same for each operating mode or different, depending on the mold configurations and/or the glass sheets to be bent, for example. For example, the lift jet array 54 may be larger in the second mode of operation compared to the first mode of operation if the glass sheets G' to be processed in the second mode of operation are larger than the glass sheets G to be processed in the first mode of operation. Even if the lift jet array 54 is the same for each mode of operation, however, position of the lift jet array 54 may be different between the modes of operation. In that regard, the lift jet array 54 may be disposed under the first upper mold 26 (e.g., proximate the left side of the bending station 14), when the glass processing system 10 is operated in the first mode, and beneath the third mold 30 (e.g., proximate the central portion of the bending station 14), when the glass processing system 10 is operated in the second mode.

Furthermore, referring to FIGS. 3 and 8, the lift jet array 54 may be positioned in a first portion 57 of a lower chamber 58 of the bending station 14 that extends beneath the conveyor arrangement 24. The housing 23 of the bending station 14 defines the lower chamber 58, as well as an upper chamber for receiving the molds 26, 28, 30. The bending station 14 may further include a partition wall 59 that separates the first portion 57 of the lower chamber 58 from a second portion 60 of the lower chamber 58, which second portion 60 is positioned adjacent the quench station 16. The partition wall 59 is configured to inhibit air from passing from the second portion 60 to the first portion 57, so that the first portion 57 may remain at an elevated temperature when glass sheets are moved out of the bending station 14. The bending station 14 may further include one or more heating devices 61a, such as one or more gas burners or radiant heating elements, positioned in the second portion 60 for heating relatively cooler air that may enter the second portion 60, and/or one or more heating devices 61b, such as one or more gas burners or radiant heating elements, positioned in the first portion 57 (e.g., attached to the partition wall 59) to ensure that the first portion 57 is maintain at an elevated temperature. In addition, the bending station 14 may include one or more supports 62, 62' such as stumps, that may support the press ring support 43, 43' and/or the press ring 42, 42' when the press ring is positioned beneath the second mold 28 or the third mold 30. Although the above features associated with the lower chamber 58 are only shown in FIGS. 3 and 8, those features may also be included in FIGS. 4-6, 9 and 10.

In addition, the glass processing system 10 may include a delivery mold, such as a quench ring 64, that receives formed glass sheets G from the second mold 28 for delivery from the bending station 14 to the quench station 16 when the bending station 14 is operating in the first mode, or that receives formed glass sheets G' from the third mold 30 for delivery from the bending station 14 to the quench station 16 when the bending station 14 is operating in the second mode.

The quench ring 64 may be mounted on a movable mold support, such as a quench ring shuttle or support 65, that is connected to an actuator 66 for moving the quench ring 64 between the bending station 14 and the quench station 16. Furthermore, the quench ring 64 and/or the quench ring support 65 may be the same for each operating mode, or different depending on the mold configurations and/or the glass sheet configurations, for example. The bending station 14 also has an opening 68 formed in the housing 23 for allowing each glass sheet G, G' to pass from the bending station 14 to the quench station 16 on the quench ring 64, and a door 70 that is movable between an open position and a closed position for covering the opening 68.

Referring to FIGS. 1, 3 and 8, the quench station 16 is positioned adjacent the bending station 14, and may have any suitable configuration for cooling the glass sheets G, G' after bending. For example, the quench station 16 may include lower and upper quench heads 72 and 74, respectively, as shown in FIGS. 3 and 8. The quench heads 72 and 74 may be the same for each operating mode, or different. For example, the quench heads 72 and 74 may each have a particular size and/or shape based on the size and/or shape of the formed glass sheets for each operating mode. As shown in FIG. 1, the glass processing system 10 may further include one or more additional cooling stations, respectively, such as first and second blowoff stations 76 and 78, respectively, for further cooling each glass sheet.

The control system 18 may have any suitable configuration for controlling operation of the above components. For example, the control system 18 may include one or more control units or controllers connected (directly or wirelessly) to various components of the system 10. In the illustrated embodiment, the control system 18 includes a control unit or controller 80 having a bundle of connections 82 for connecting with the various components of the glass processing system 10, such as the heating elements of the furnace 12, the conveyor system 20, the conveyor system 24, the first lift mechanism 32, the second lift mechanism 34, the actuators 44 and 66, the vacuum system 48, the lift system 52 and the quench station 16. Furthermore, the controller 80 may comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip). In lieu of the connections 82, the controller 80 may instead be connected wirelessly to one or more of the above components. Furthermore, the controller 80 may comprise multiple control units or controllers that are configured to communicate with each other.

Operation of the glass processing system 10 will now be described in greater detail with reference to the drawings. As mentioned above, the glass processing system 10 is configured to operate in at least the first and second modes. Furthermore, the first and second modes may be used to process first and second sets of glass sheets, respectively, wherein the first and second sets of glass sheets may be different (e.g., different glass sheet sizes and/or shapes) and/or the desired processed configurations may be different between the sets.

Referring to FIGS. 1-6, operation of the glass processing system 10 in the first mode will be described first. As shown in FIG. 1, and as mentioned above, the bending station 14 may be offset with respect to the furnace 12. For example, the left side of the housing 23 of the bending station 14 may be generally aligned with the leftmost side of the housing 19 of the furnace 12, and the right side of the housing 23 of the bending station 14 may extend 10 to 20 inches (e.g., 13 to 15 inches, or at least 12 inches) to the right of the rightmost side of the housing 19 of the furnace 12. Likewise, the first and second molds 26 and 28, respectively, may be offset with respect to a longitudinal centerline 84 of the furnace 12, as shown in FIG. 2. For example, a centerline 86 of the first mold 26 may be positioned at least 2 or 6 inches (e.g., about 12¾ inches) to the left of the furnace centerline 84, and a centerline 88 of the second upper mold 28 be positioned at least 12 or 16 inches (e.g., about 21¾ inches) to the right of the furnace centerline 84. With such a configuration, the method of operating the glass processing system 10 in the first mode may include conveying a first set of glass sheets G through the furnace 12 and along the conveyor system 20 so that a center of each glass sheet G of the first set of glass sheets is positioned on a first side (e.g., left side in the embodiment shown in FIG. 2) of the centerline 84 of the furnace 12. For example, the control system 18 may control operation of the conveyor system 20 to convey the first set of glass sheets through the furnace 12 so that the center of each glass sheet G of the first set is positioned at least 2 inches away from the centerline 84 of the furnace 12 on the first side, and/or so that each glass sheet G of the first set is positioned proximate a left edge of the usable space of the furnace 12. As another example, the conveyor system 20 may be operated to convey the first set of glass sheets through the furnace 12 so that the center of each glass sheet G of the first set is aligned with the centerline 86 of the first mold 26. Furthermore, during conveyance, each glass sheet G of the first set may be sufficiently heated prior to entering the bending station 14.

Referring to FIG. 3, when a particular glass sheet G of the first set is positioned above the gas jet array 54 in the bending station 14, with the first mold 26 moved (e.g., lowered) by the first lift mechanism 32 to a position proximate the glass sheet G (shown in phantom lines in FIG. 3) on the conveyor system 24, the gas jet array 54 may be operated to lift the glass sheet G off the conveyor system 24 and toward and against the mold surface of the first mold 26 for initial forming of the glass sheet G against the first mold 26 (the glass sheet G is shown in solid lines against the first mold 26 in FIG. 3). The vacuum system 48 may also be operated to create a vacuum at the mold surface of the first mold 26 to assist in drawing the glass sheet G toward the mold surface and/or to hold the glass sheet against the mold surface. The mold surface of the first mold 26 may have straight-line elements (e.g., laterally extending straight-line elements), and may formed with a partial cylindrical shape or a partial conical shape, for example, such as disclosed in U.S. Pat. No. 9,452,948.

Figure 4:
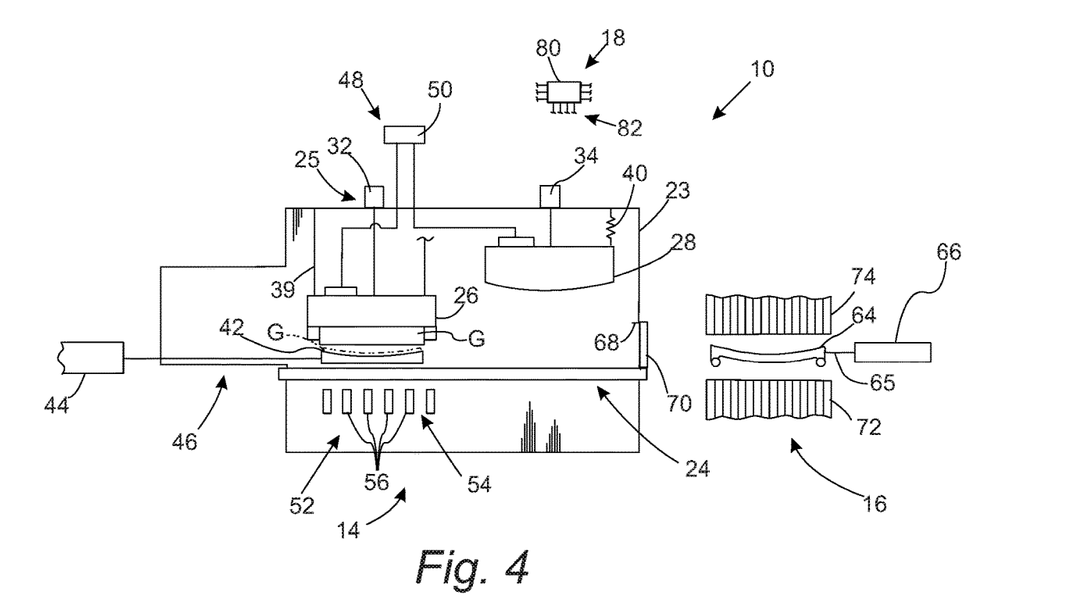
FIG. 4 is a schematic view similar to FIG. 3 showing the first upper mold in an intermediate position, with a lower mold positioned underneath the first upper mold to receive the glass sheet from the first upper mold.

Referring to FIG. 4, the first mold 26 may then be raised by the first lift mechanism 32 to an intermediate position so that the press ring 42 may be moved by the actuator 44 to a position underneath the first upper mold 26. The first upper mold 26 may then be lowered slightly by the first lift mechanism 32, if needed, so that the glass sheet G may be transferred from the first upper mold 26 to the press ring 42 so that further forming of the glass sheet G, such as by gravity sagging, may occur on the press ring 42. The glass sheet is shown in solid lines against the first mold 26 in FIG. 4, and in phantom lines transferred to the press ring 42. As mentioned above, the press ring 42 may be unlockable (e.g., un-clampable) from and/or movable (e.g., slidable) with respect to the press ring support 43 to allow alignment of the press ring 42 with the first mold 26 when the press ring 42 is positioned beneath the first mold 26 and the first mold 26 is moved toward the press ring 42.

Figure 5:
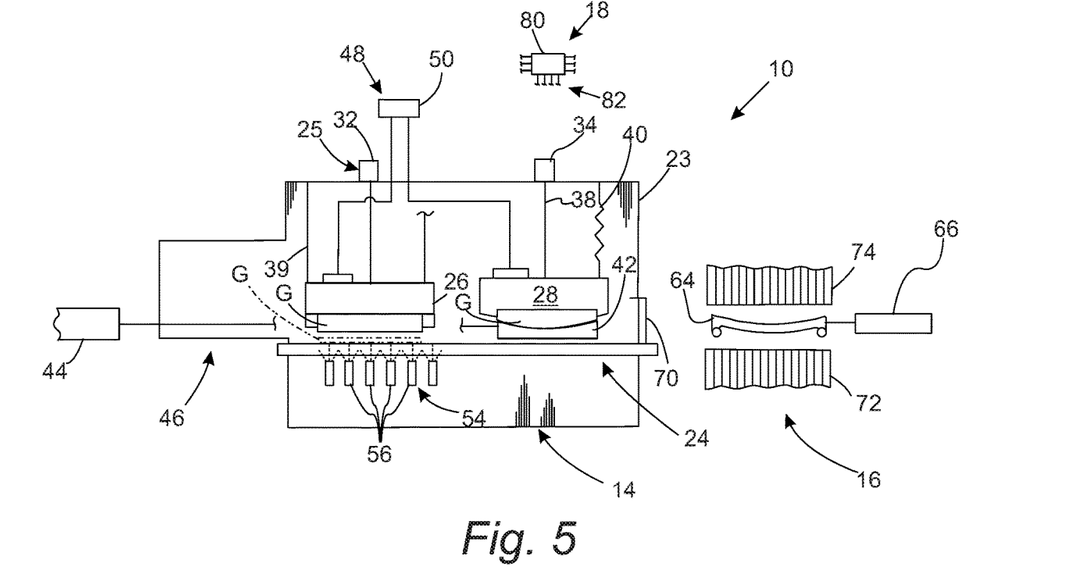
FIG. 5 is a schematic view similar to FIG. 3 showing the lower mold positioned beneath the second upper mold and the second upper mold moved to a lowered position to press the glass sheet between the second upper mold and the lower mold, wherein the first upper mold is shown in the lowered position to receive a second glass sheet from the conveyor system of the bending station.

Next, referring to FIG. 5, the press ring 42 may be moved laterally by the actuator 44 to a position underneath the second mold 28, so that the glass sheet G may be pressed formed between the second mold 28 and the press ring 42. Prior to the press forming, the press ring 42 may be re-locked to the press ring support 43 so that the press ring 42 does not move with respect to the press ring support 43. During press forming, the second lift mechanism 34 operates to move the second upper mold 28 toward the press ring 42, and the second mold 28 may move laterally, due to the configuration of the second supports 40 mentioned above, so that the second mold 28 may align with the press ring 42. Furthermore, the second mold 28 may have a mold surface with any suitable configuration, such as a convex surface configuration, so that the glass sheet G may be formed with a relatively complex 3-D shape. In addition, the vacuum system 48 may be operated during the press forming to facilitate shaping of the glass sheet G against the second mold 28.

During the press forming, the first mold 26 may also be lowered to its lowered position by the first lift mechanism 32 in order to receive another (e.g., second) glass sheet G of the first set from the conveyor system 24 (the second glass sheet G is shown in phantom lines on the conveyor system 24, and in solid lines against the first mold 26). The first mold 26 may then be moved to a raised position with the second glass sheet G before the door 70 is moved to the open position to allow the press formed glass sheet G to exit the bending station 14.

Figure 6:
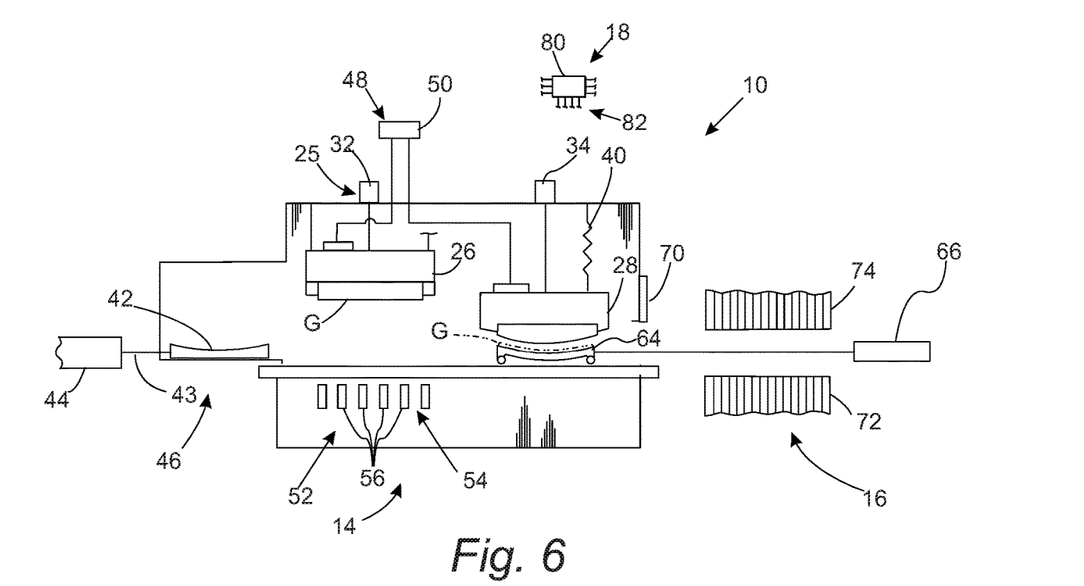
FIG. 6 is a schematic view similar to FIG. 3 showing the second upper mold in an intermediate position and a delivery mold positioned beneath the second upper mold to receive the formed glass sheet from the second upper mold, wherein the first upper mold is shown in a raised position with the second glass sheet held against the first upper mold.

Referring to FIG. 6, the second mold 28 may then be sufficiently raised by the second lift mechanism 34 so that the press ring 42 may be returned to the hot box 46, and so that the quench ring 64 may be moved by the actuator 66 to a position under the second mold 28 to receive the press formed glass sheet G from the second mold 28. The second mold 28 may then be lowered slightly, if needed, to transfer the press formed glass sheet G to the quench ring 64 (the press formed glass sheet G is shown in solid lines against the second mold 28, and in phantom lines transferred to the quench ring 64). The vacuum system 48 may also be operated to draw a vacuum at a mold surface of the second mold 28 so that the glass sheet may be held against the mold surface when the second mold 28 is raised, and then the vacuum system 48 may be deactivated to transfer the glass sheet from the second mold 28 to the quench ring 64 after the second mold 28 has been lowered to a position proximate the quench ring 64.

As also shown in FIG. 6, after the first mold 26 has been moved to the raised position with the second glass sheet G, the first mold 26 is held in the raised position, which is above the opening 68 formed in the housing 23, when the door 70 is in the open position and the quench ring 64 is being moved in and out of the bending station 14. As a result, the second glass sheet G being held against the first mold 26 by the vacuum system 48 may be positioned in an upper portion of the bending station 14 when the door 70 is in the open position so that the second glass sheet G is thermally protected (e.g., any inadvertent cooling of the second glass sheet G may be minimized or inhibited). For example, the control system 18 may be configured to control the vacuum system 48 to retain the second glass sheet G against the first mold 26 for at least 3, 4, 5, 6, or 7 seconds when the first mold 26 is in the raised position and the door 70 is in the open position. The first mold 26 may also be held in the raised position with the second glass sheet G for a longer period of time than the time during which the door 70 is in the open position. For example, the door 70 may be in the open position for at least 3 seconds (e.g., 3 to 5 seconds), and the first mold 26 and the second glass sheet G may be held in the raised position for at least 5 seconds (e.g., 5 to 8 seconds), including the time when the door 70 is in the open position. Furthermore, when the glass processing system 10 is operated in the first mode, the first set of the glass sheets G may be conveyed on the conveyor arrangement 24 so that any glass sheet of the first set is only positioned on the conveyor arrangement 24 in lateral alignment with the opening 68 when the door 70 is in the closed position.

Still referring to FIG. 6, after the glass sheet G has been transferred to the quench ring 64, the quench ring 64 may then be moved laterally out of the bending station 14 and into the quench station 16 for quenching of the glass sheet G. For example, the quench ring 64 may be positioned between the quench heads 72 and 74 (such as shown in FIG. 5) so that the quench heads 72 and 74 may provide quench fluid (e.g., air) to the glass sheet G in order to sufficiently quench the glass sheet G. The glass processing system 10 may also include one or more additional cooling stations, such as the blowoff stations 76 and 78 shown in FIG. 1. A further cooling station, not shown in the figures, may be used to further cool each glass sheet G to ambient temperature.

The above process may be repeated for each glass sheet G of the first set. Furthermore, by using the first and second molds 26 and 28, respectively, which are independently movable through independent control of the lift mechanisms 32 and 34, the glass processing system 10 may be operated so that the cycle time for each glass sheet G through the bending station 14 and the quench station 16 is less than 30 seconds (e.g., about 28.5 seconds). In addition, a new glass sheet G may enter the bending station 14 about every 12 seconds.

Figure 11:
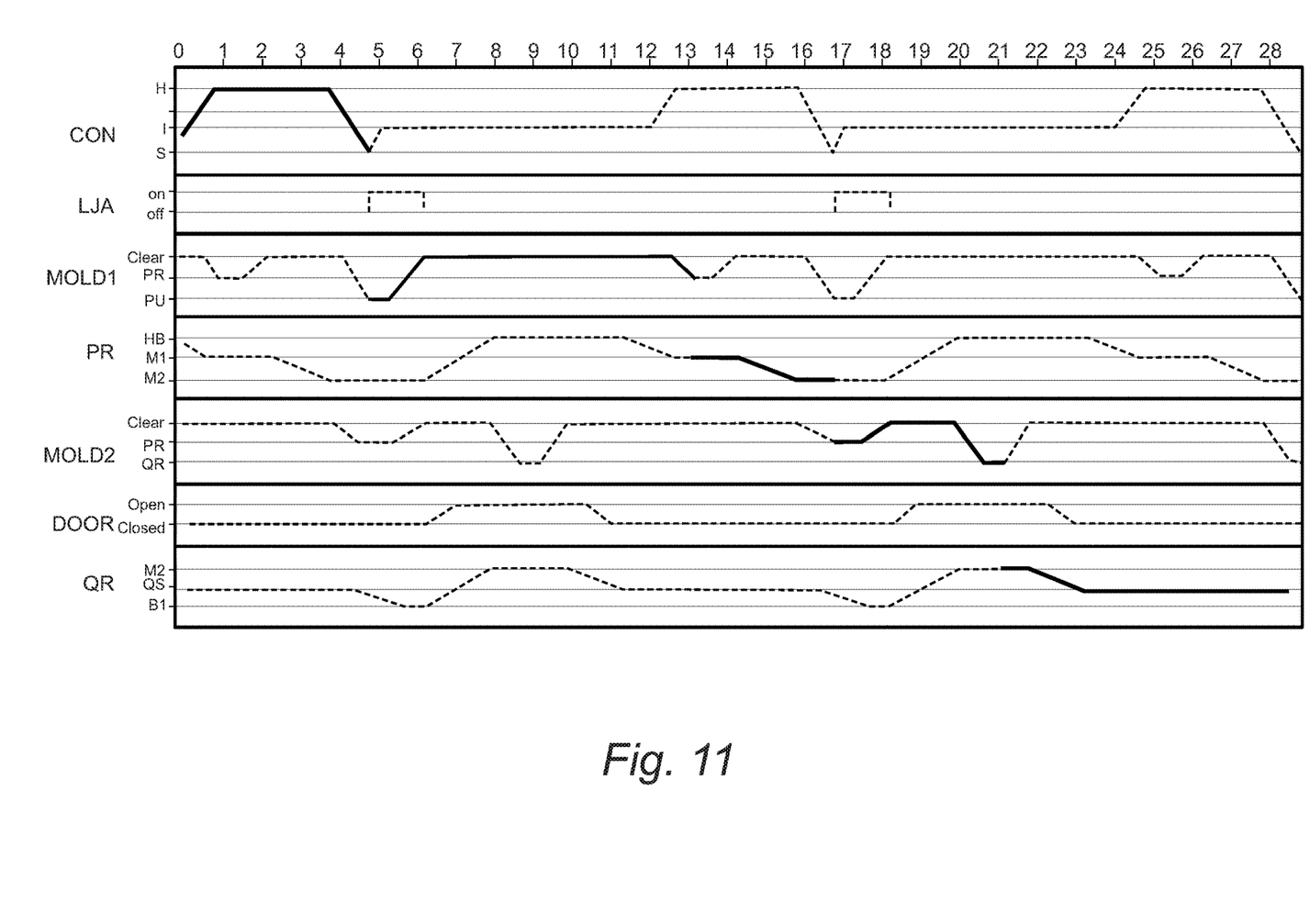
FIG. 11 is a timing chart including multiple graphs that indicate operation of various components of the glass processing system in the first mode.

Referring to FIG. 11, an example timing chart is shown, which includes multiple graphs that indicate operation of various components of the glass processing system 10 in the first mode. The graph labeled CON indicates the velocity profile of the conveyor system 24 over time, where S indicates slow speed, I indicates intermediate speed (e.g., at least double the slow speed and/or the same speed as the conveyor system 20 of the furnace 12), and H indicates high speed (e.g, at least three times or four times the intermediate speed). The graph labeled LJA shows when the lift jet array 54 may be turned on or off. The graph labeled MOLD 1 indicates vertical position of the first mold 26 over time. For the MOLD 1 graph, CLEAR indicates the raised vertical position of the first mold 26 (shown in FIG. 6), PR indicates the intermediate vertical position of the first mold 26 (shown in FIG. 4) when the press ring 42 is positioned beneath the first mold 26 for glass sheet transfer from the first mold 26 to the press ring 42, and PU indicates the lowered position of the first mold 26 (shown in FIG. 3) when it is positioned proximate the conveyor system 24 for glass sheet pickup. The graph labeled PR indicates lateral position of the press ring 42 over time. For the PR graph, HB indicates when the press ring 42 is positioned in the hot box 46 (shown in FIG. 3), M1 indicates when the press ring 42 is positioned underneath the first mold 26 (shown in FIG. 4), and M2 indicates when the press ring 42 is positioned underneath the second mold 28 (shown in FIG. 5). The graph labeled MOLD 2 indicates vertical position of the second mold 28 over time. For the MOLD 2 graph, CLEAR indicates a raised vertical position of the second mold 28 (shown in FIGS. 3 and 4), PR indicates a lowered vertical position of the second mold 28 (shown in FIG. 5) when the press ring 42 is positioned beneath the second mold 28 for press forming and glass sheet transfer from the press ring 42 to the second mold 28, and QR indicates an intermediate position of the second mold 28 (shown in FIG. 6) when the quench ring 64 is positioned beneath the second mold 28 for glass sheet transfer from the second mold 28 to the quench ring 64. The graph labeled DOOR indicates when the door 70 of the bending station 14 is open or closed. Finally, the graph labeled QR shows lateral position of the quench ring 64 over time. For the QR graph, M2 indicates when the quench ring 64 is positioned beneath the second mold 28 (shown in FIG. 6) for glass sheet transfer from the second mold 28 to the quench ring 64, QS indicates when the quench ring 64 is positioned in the quench station 16 between the quench heads 72 and 74, and B1 indicates when the quench ring 64 is positioned in the first blowoff station 76.

The thickened solid line portions or segments of each graph in FIG. 11 indicate position of a particular glass sheet G as it progresses across various tools of the bending station 14 and quench station 16 over time. As shown in FIG. 11, that particular glass sheet G takes less than 24 seconds (e.g., about 23.24 seconds) to progress from the conveyor system 24 to the quench station 16. Furthermore, referring to the MOLD 1 graph and the DOOR graph, the glass sheet G is held against the first mold 26 when the first mold 26 is in the raised vertical position (i.e., CLEAR position) and the door 70 is in the open position so that the glass sheet is thermally protected while the door 70 is open.

Referring to FIGS. 7-10, operation of the glass processing system 10 in the second mode will now be described. As shown in FIGS. 7 and 8, the bending station 14 is reconfigured for operating in the second mode. In that regard, the first and second molds 26 and 28 are removed, and the third upper mold 30 is provided instead. Furthermore, the third mold 30 is connected to both of the lift mechanisms 32 and 34, as well as the vacuum system 48. The third mold 30 may also include a mold support or frame 90 to facilitate connection with the lift mechanisms 32 and 34 and the vacuum system 48. Referring to FIG. 8, the third mold 30 (e.g., the mold frame 90) may be guided at one end by the one or more first supports 39, and at the other end by the one or more second supports 40, which are described above in connection with the first and second molds 26 and 28, respectively. Since the second supports 40 are laterally movable, as mentioned above, they can accommodate thermal expansion of the third mold 30. In addition, the third mold 30 may be positioned so that a center of the third mold 30 is offset with respect to the centerline 84 of the furnace 12. For example, the center of the third upper mold 30 may be positioned about 2 to 7 inches (e.g., 4.5 inches) to the right of the centerline 84. With such a configuration, the second mode of operation may include conveying a second set of glass sheets G' through the furnace 12 and along the conveyor system 20 so that a center of each glass sheet G' of the second set of glass sheets is positioned on a second side (e.g., right side in the embodiment shown in FIG. 7) of the centerline 84 of the furnace 12. For example, the control system 18 may control the conveyor system 20 to convey the second set of glass sheets G' along the furnace 12 so that the center of each glass sheet G' of the second set is positioned at least 2 inches away from the centerline 84 of the furnace 12 on the second side. As another example, the conveyor system 20 may be operated to convey the second set of glass sheets through the furnace 12 so that the center of each glass sheet G' of the second set is aligned with a centerline or center of the third mold 30. Furthermore, during conveyance, each glass sheet G' of the second set may be sufficiently heated prior to entering the bending station 14.

When a particular glass sheet G' of the second set is positioned above the gas jet array 54, with the third mold 30 moved to a position proximate the glass sheet G' (shown in phantom lines in FIG. 8) on the conveyor system 24, the gas jet array 54 may be operated to lift the glass sheet G' off the conveyor system 24 and toward a mold surface of the third mold 30 (the glass sheet G' is shown in solid lines against the third mold 30 in FIG. 8). The vacuum system 48 may also be operated to create a vacuum at the mold surface of the third mold 30 to assist in drawing the glass sheet G' toward the mold surface and/or to hold the glass sheet G' against the mold surface of the third mold 30.

Figure 9:
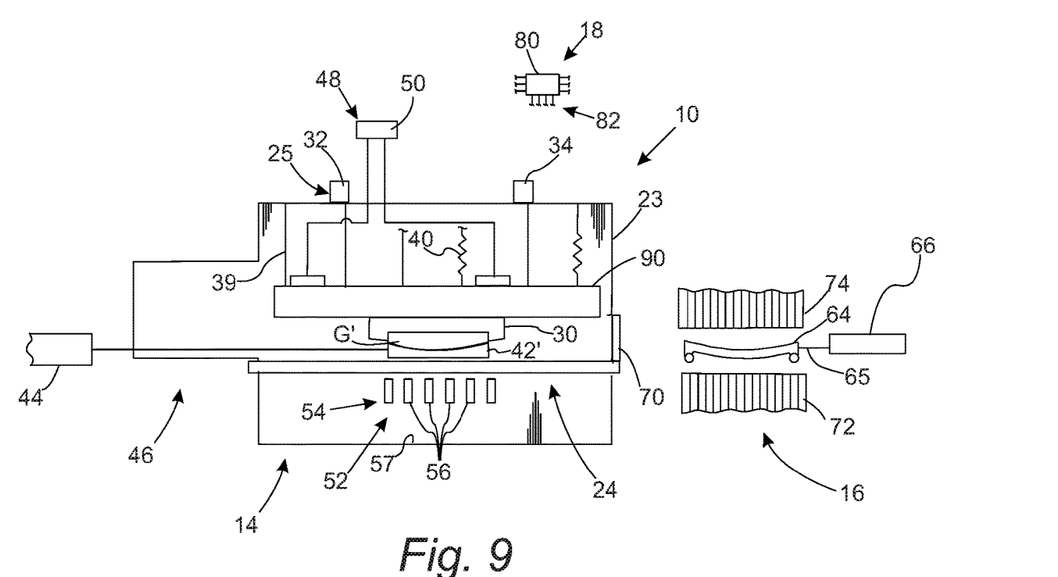
FIG. 9 is a schematic view similar to FIG. 8 showing a lower mold positioned beneath the third upper mold, wherein the third upper mold is shown in an intermediate position for pressing the glass sheet between the third upper mold and the lower mold.

Referring to FIG. 9, the third mold 30 may then be raised to an intermediate position so that the press ring 42' may be moved by the actuator 44 to a position underneath the third mold 30, and then the third mold 30 may be lowered so that the glass sheet G' may be pressed formed between the third mold 30 and the press ring 42'. As shown in FIG. 9, both lift mechanisms 32 and 34 are connected to the third mold 30, and the control system 18 is configured to operate the lift mechanisms 32 and 34 simultaneously so that the third mold 30 may be raised and lowered as desired. Furthermore, like the press ring 42 in the first mode of operation, the press ring 42' may be unlockable, releasable or detachable (e.g., unclampable) from and/or movable (e.g., slidable) with respect to the press ring support 43' to allow alignment of the press ring 42' with the third mold 30 when the press ring 42' is positioned beneath the third mold 30 and the third mold 30 is moved toward the press ring 42'.

Figure 10:
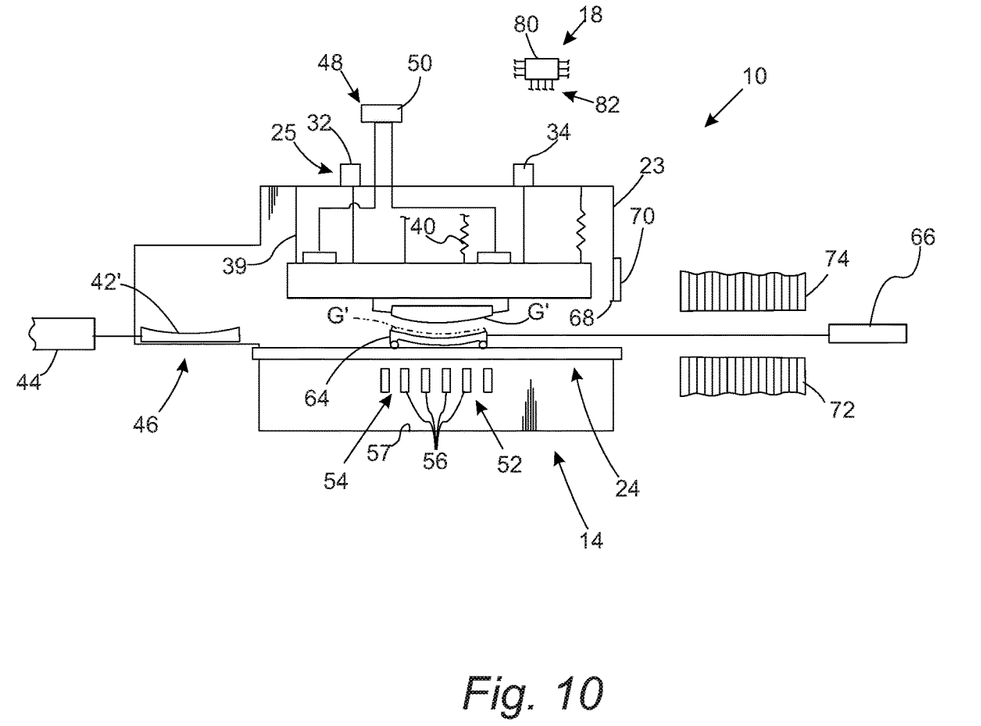
FIG. 10 is a schematic view similar to FIG. 8 with a delivery mold positioned beneath the third upper mold to receive the formed glass sheet from the third upper mold.

Referring to FIG. 10, the third mold 30 may then be sufficiently raised by the lift mechanisms 32 and 34 so that the press ring 42' may be returned to the hot box 46, and so that the quench ring 64 may be positioned under the third mold 30 to receive the press formed glass sheet G' from the third mold 30. The press ring 42' may also be relocked or reattached (e.g., re-clamped) to the press ring support 43' prior to returning the press ring 42' to the hot box 46. The third mold 30 may then be lowered slightly, if needed, to transfer the press formed glass sheet G' to the quench ring 64 (the press formed glass sheet G' is shown in solid lines against the third mold 30, and in phantom lines transferred to the quench ring 64).

The vacuum system 48 may also be operated to draw a vacuum at the mold surface of the third mold 30 so that the glass sheet G' may be held against the mold surface when the third mold 30 is raised, and then the vacuum system 48 may be deactivated to transfer the glass sheet G' from the third mold 30 to the quench ring 64.

Next, the actuator 66 may be operated to move the quench ring 64 laterally out of the bending station 14 and into the quench station 16 for quenching of the glass sheet G'. For example, the quench ring 64 may be positioned between the quench heads 72 and 74 so that the quench heads 72 and 74 may provide quench fluid (e.g., air) to the glass sheet in order to sufficiently quench the glass sheet G'. As mentioned above, the glass processing system 10 may also include one or more additional cooling stations, such as the blowoff stations 76 and 78 shown in FIG. 1. A further cooling station, not shown in the figures, may be used to further cool each glass sheet G' to ambient temperature.

After the quench ring 64 with the glass sheet G' has been moved out of the bending station 14 and the door 70 has been moved to the closed position, another glass sheet G' of the second set may be moved by the conveyor system 24 to a position beneath the third mold 30 so that the above process may be repeated. Furthermore, the above process may be repeated for each glass sheet G' of the second set.

With the above configuration, the glass processing system 10 may be operated in different modes to process glass sheets in different manners. For example, as mentioned above, the first operating mode may provide a three stage bending operation, which may be beneficial for efficiently achieving a complex three-dimensional shape (formed portions with relatively high radii of curvature) for each formed glass sheet G. Additional details of a three stage bending operation are disclosed in U.S. Pat. No. 9,452,948, which, as mentioned above, is hereby incorporated by reference in its entirety. The second operating mode may provide a single stage bending operation, which may be beneficial for efficiently achieving a less complex shape for each formed glass sheet G', such as a generally flat or slightly curved rear window for a motor vehicle.

Furthermore, in the first mode of operation of the glass processing system 10, with a usable space width of the furnace 12 of less than 50 inches (e.g., 48 inches) and a usable space width of the bending station 14 of less than 62 inches (e.g., 60 inches), glass sheets G having a height or lateral width of up to 22.5 inches may be processed. In addition, in the second mode of operation of the glass processing system 10, glass sheets G' having a height or lateral width of up to 46 inches may be processed with the same usable widths of the furnace 12 and the bending station 14.

As mentioned above, many system components may be the same between the operating modes. For example, the furnace 12, the quench station 16, the control system 18, the lift mechanisms 32 and 34, the press ring support 43, 43', the actuators 44, 66, and the vacuum system 48 may be the same for each operating mode. Furthermore, other system components may be efficiently changed depending on the operating mode. For example, the molds 26 and 28 may be replaced with the third mold 30 when switching between the first and second modes of operation. Likewise, the press ring 42 may be replaced with the press ring 42' when switching from the first mode to the second mode. In addition, the lift jet array 54 and the quench ring 64 may be changed as needed depending on the operating mode.

It should also be noted that the stroke of the press ring support 43 in the first operating mode may be different than the stroke of the press ring support 43' in the second operating mode. In that regard, referring to FIGS. 5 and 9, the stroke for the press ring support 43 may be larger, such as 5% to 10% larger (e.g., 7% larger), than the stroke of the press ring support 43', due to position of the second mold 28 compared to the position of the third mold 30 in the bending station 14. Likewise, the stroke of the delivery mold 64 may be different depending on the operating mode. For example, referring to FIGS. 5, 6, 9 and 10, the stroke of the delivery mold 64 in the second operating mode may be larger, such as 10% to 20% larger (e.g., 14.6% larger), than the stroke of the delivery mold 64 in the first operating mode, due to position of the third mold 30 compared to the position of the second mold 28 in the bending station 14.

Furthermore, as mentioned above, position of the lift jet array 54 may be different between the two modes of operation. For example, the position of the lift jet array 54 may be selected or adjusted in order to align the lift jet array 54 with position of each glass sheet G or G' on the conveyor system 20 of the furnace 12 and/or based on position of the first mold 26, when operating in the first mode, or position of the third mold 30, when operating in the second mode.

If the lift jet array 54 is different for each operating mode, position of the conveyor rollers of the conveyor system 24 may be adjusted as needed to account for different positions and/or configurations of the outlets 56. In that regard, as shown in FIG. 3, each conveyor roller may extend across an entire width of the bending station 14 so that the conveyor rollers are accessible to adjust spacing between the conveyor rollers with roller shifters, for example.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A glass processing system comprising:
    a heating station to heat glass sheets;
    a bending station disposed downstream of the heating station to bend the heated glass sheets, the bending station comprising first and second independent movement mechanisms configured to independently move first and second molds when the glass processing system is operated in a first mode, and to cooperate to move a third mold when the glass processing system is operated in a second mode; and
    a control system to control the movement mechanisms so that they operate independently when the glass processing system is operated in the first mode, and so that they operate simultaneously when the glass processing system is operated in the second mode;
    wherein the first and second molds comprise first and second upper molds, respectively, and wherein, when the glass processing system is operated in the first mode, the bending station further comprises a lower mold mounted on a movable mold support that is movable laterally to move the lower mold from a position beneath the first upper mold to a position beneath the second upper mold so that the lower mold is spaced laterally away from the first upper mold.

2. The glass processing system of claim 1 wherein the heating station has a heating station housing, and the bending station has a bending station housing that is wider than the heating station housing to accommodate the first and second molds when the glass processing system is operated in the first mode.

3. The glass processing system of claim 2 wherein the bending station housing is at least 30.48 centimeters (12 inches) wider than the heating station housing.

4. The glass processing system of claim 1 wherein the first upper mold is mounted on a first support so that the first upper mold is laterally fixed, and the second upper mold is mounted on a second support so that the second upper mold can move laterally, and wherein the lower mold is movable with respect to the mold support to allow alignment of the lower mold with the first upper mold when the lower mold is in the position beneath the first upper mold, and the lower mold is configured to be fixedly attached to the mold support when the lower mold is in the position beneath the second upper mold and the second upper mold is movable laterally to align with the lower mold.

5. The glass processing system of claim 4 wherein the second support is configured to sway to allow lateral movement of the second upper mold.

6. The glass processing system of claim 5 wherein the second support comprises at least one chain or flexible member.

7. The glass processing system of claim 1 further comprising a quench station positioned adjacent the bending station for cooling the glass sheets, wherein the bending station has an opening for allowing each glass sheet to pass from the bending station to the quench station, and a door that is movable between an open position and a closed position for covering the opening, wherein, when the glass processing system is operated in the first mode, the bending station further includes a vacuum system in fluid communication with the first upper mold for drawing each glass sheet of a first set of the glass sheets against the first upper mold, and wherein the control system is configured to control the vacuum system to retain a first glass sheet of the first set against the first upper mold for at least 3 seconds when the first upper mold is in a raised position above the opening and the door is in the open position.

8. The glass process system of claim 1 further comprising a quench station positioned adjacent the bending station for cooling the glass sheets, wherein the bending station comprises a conveyor arrangement for conveying the glass sheets along a horizontal plane of conveyance, an opening for allowing each glass sheet to pass from the bending station to the quench station, and a door that is movable between an open position and a closed position for covering the opening, and wherein, when the glass processing system is operated in the first mode, the control system is configured to control operation of the conveyor arrangement to convey a first set of the glass sheets so that any glass sheet of the first set is only positioned on the conveyor arrangement in lateral alignment with the opening when the door is in the closed position.

9. The glass processing system of claim 8 wherein, when the glass processing system is operated in the first mode, the bending station further includes a lift system configured to lift each glass sheet of the first set of glass sheets off of the conveyor arrangement and toward the first upper mold, and wherein the control system is configured to operate the lift system to lift a first glass sheet of the first set upwardly from the conveyor arrangement and toward the first upper mold when the door is in the closed position.

10. The glass processing system of claim 1 wherein the bending station comprises a conveyor arrangement for conveying the glass sheets along a horizontal plane of conveyance, a housing that defines a lower chamber beneath the conveyor arrangement, and a partition wall that separates first and second portions of the lower chamber, wherein the partition wall is configured to inhibit air from passing from the second portion to the first portion.

11. The glass processing system of claim 1 wherein the heating station includes a conveyor arrangement for conveying the glass sheets longitudinally along the heating station, wherein when the glass processing system is operated in the first mode, the conveyor arrangement is operable to convey a first set of the glass sheets so that a center of each glass sheet of the first set is positioned on a first side of a longitudinal centerline of the heating station, and when the glass processing system is operated in the second mode, the conveyor arrangement is operable to convey a second set of the glass sheets so that a center of each glass sheet of the second set is positioned on an opposite second side of the longitudinal centerline of the heating station.

12. The glass processing system of claim 11 wherein, when the glass processing system is operated in the first mode, the conveyor arrangement is operable to convey the first set of the glass sheets so that the center of each glass sheet of the first set is positioned at least 2 inches away from the longitudinal centerline of the heating station on the first side of the longitudinal centerline of the heating station, and wherein, when the glass processing system is operated in the second mode, the conveyor arrangement is operatable to convey the second set of the glass sheets so that the center of each glass sheet of the second set is positioned at least 2 inches away from the longitudinal centerline of the heating station on the second side of the longitudinal centerline of the heating station.

13. The glass processing system of claim 1 wherein the third mold comprises a third upper mold, wherein, when the glass processing system is operated in the first mode, the first upper mold is connected to the first movement mechanism, and the second upper mold is connected to the second movement mechanism, and wherein, when the glass processing system is operated in the second mode, the third mold is connected to the first and second movement mechanisms.

14. The glass processing system of claim 1 wherein each movement mechanism comprises an actuator.

15. The glass processing system of claim 1 wherein, when the glass processing system is operated in the first mode, the first movement mechanism is operable to position the first upper mold proximate a glass sheet on a conveyor system so that the glass sheet may be transferred to the first upper mold, the mold support is movable laterally to move the lower mold to the position beneath the first upper mold to receive the glass sheet from the first upper mold, then the mold support is movable laterally to move the lower mold and the glass sheet to the position beneath the second upper mold, and the second movement mechanism is operable to move the second upper mold toward the lower mold to press form the glass sheet between the second upper mold and the lower mold.

16. The glass processing system of claim 1 wherein, when the glass processing system is operated in the first mode, the mold support is movable laterally to move the lower mold to the position beneath the first upper mold to receive a glass sheet from the first upper mold, and then the mold support is movable laterally to move the lower mold and the glass sheet to the position beneath the second upper mold.

17. The glass processing system of claim 16 wherein, when the glass processing system is operated in the first mode, the second movement mechanism is operable to move the second upper mold toward the lower mold to press form the glass sheet between the second upper mold and the lower mold when the lower mold is in the position beneath the second upper mold.

18. A glass processing system comprising:
   a heating station to heat glass sheets;
   a bending station disposed downstream of the heating station to bend the heated glass sheets, the bending station comprising a movement arrangement configured to independently move first and second molds when the glass processing system is operated in a first mode, and to move a third mold when the glass processing system is operated in a second mode;
   a controller to control the movement arrangement to independently move the first and second molds when the glass processing system is operated in the first mode, and to move the third mold when the glass processing system is operated in the second mode; and a quench station positioned adjacent the bending station for cooling the glass sheets;

wherein the bending station comprises a conveyor system for conveying the glass sheets along a horizontal plane of conveyance, an opening for allowing each glass sheet to pass from the bending station to the quench station, and a door that is movable between an open position and a closed position for covering the opening, and wherein, when the glass processing system is operated in the first mode, the conveyor system is operable to convey a first set of the glass sheets so that any glass sheet of the first set is only positioned on the conveyor system in lateral alignment with the opening when the door is in the closed position.

19. The glass processing system of claim 18 wherein the movement arrangement comprises first and second independent lift mechanisms configured to independently lift the first and second molds when the glass processing system is operated in the first mode, and to cooperate with each other to lift the third mold when the glass processing system is operated in the second mode.

20. The glass processing system of claim 18 wherein the heating station has a heating station housing, and the bending station has a bending station housing that is wider than the heating station housing to accommodate the first and second molds when the glass processing system is operated in the first mode.

21. The glass processing system of claim 18 wherein the first and second molds comprise first and second upper molds, respectively, and wherein, when the glass processing system is operated in the first mode, the bending station further comprises a press ring mounted on a movable press ring support and positionable beneath the first and second upper molds, the first upper mold is mounted on a first support so that the first upper mold is laterally fixed, and the second upper mold is mounted on a second support so that the second upper mold can move laterally, and wherein the press ring is movable with respect to the press ring support to allow alignment of the press ring with the first upper mold when the press ring is positioned beneath the first upper mold, and the press ring is configured to be fixedly attached to the press ring support when the press ring is positioned beneath the second upper mold and the second upper mold is movable laterally to align with the press ring.

22. The glass processing system of claim 21 wherein the second support is configured to sway to allow lateral movement of the second upper mold.

23. The glass processing system of claim 18 wherein, when the glass processing system is operated in the first mode, the first and second molds comprise first and second upper molds, respectively, and the bending station further includes a vacuum system in fluid communication with the first upper mold for drawing each glass sheet of the first set of the glass sheets against the first upper mold, and wherein the controller is configured to control the vacuum system to retain a first glass sheet of the first set against the first upper mold for at least at least 5 seconds when the first upper mold is in a raised position above the opening, including at least 3 seconds when the door is in the open position.

24. The glass processing system of claim 18 wherein the bending station comprises a lower chamber that extends beneath the conveyor system, the lower chamber including first and second portions separated by a partition wall that is configured to inhibit air from passing from the second portion to the first portion.

25. The glass processing system of claim 18 wherein the heating station includes a conveyor system for conveying the glass sheets longitudinally along a plane of conveyance, wherein when the glass processing system is operated in the first mode, the conveyor system of the heating station is operable to convey the first set of the glass sheets so that a center of each glass sheet of the first set is positioned on a first side of a longitudinal centerline of the heating station, and when the glass processing system is operated in the second mode, the conveyor system of the heating station is operable to convey a second set of the glass sheets so that a center of each glass sheet of the second set is positioned on an opposite second side of the longitudinal centerline of the heating station.

26. The glass processing system of claim 25 wherein, when the glass processing system is operated in the first mode, the conveyor system of the heating station is operable to convey the first set of the glass sheets so that the center of each glass sheet of the first set is positioned at least 2 inches away from the longitudinal centerline of the heating station on the first side of the longitudinal centerline of the heating station, and wherein, when the glass processing system is operated in the second mode, the conveyor system of the heating station is operable to convey the second set of the glass sheets so that the center of each glass sheet of the second set is positioned at least 2 inches away from the longitudinal centerline of the heating station on the second side of the longitudinal centerline of the heating station.

27. The glass processing system of claim 18 wherein the first and second molds comprise first and second upper molds, respectively, and wherein, when the glass processing system is operated in the first mode, the first and second upper molds are each connected to the movement arrangement so that the first and second upper molds are independently movable, and the bending station further comprises a lower mold mounted on a movable mold support that is movable laterally to move the lower mold from a position beneath the first upper mold to a position beneath the second upper mold.

28. A method for processing glass sheets using a glass processing system having a bending station with first and second movement mechanisms, the method comprising:

operating the glass processing system in a first mode in which the bending station includes first and second molds connected to the first and second movement mechanisms, respectively, wherein the first mode includes operating the movement mechanisms independently to independently move the first and second molds; and operating the glass processing system in a second mode in which the bending station includes a third mold connected to the first and second movement mechanisms, wherein the second mode includes operating the movement mechanisms simultaneously to move the third mold;

wherein the first and second molds comprise first and second upper molds, respectively, and wherein, when the glass processing system is operated in the first mode, the bending station further comprises a lower mold mounted on a movable mold support that is movable laterally to move the lower mold from a position beneath the first upper mold to a position beneath the second upper mold so that the lower mold is spaced laterally away from the first upper mold.

29. The method of claim 28 wherein the third mold comprises a third upper mold, and wherein, when the glass processing system is operated in the second mode, the bending station further comprises an additional lower mold mounted on the movable mold support and positionable beneath the third upper mold.

30. The method of claim 28 wherein operating the glass processing system in the first mode comprises positioning the first upper mold proximate a glass sheet on a conveyor system using the first movement mechanism, raising the first upper mold with the glass sheet using the first movement mechanism, moving the lower mold to the position beneath the first upper mold, transferring the glass sheet from the first upper mold to the lower mold, then moving the lower mold laterally to the position beneath the second upper mold, and press forming the glass sheet between the second upper mold and the lower mold using the second movement mechanism.

31. A glass processing system comprising:
- a heating station to heat glass sheets;
- a bending station disposed downstream of the heating station to bend the heated glass sheets, the bending station comprising a movement arrangement configured to independently move first and second molds when the glass processing system is operated in a first mode, and to move a third mold when the glass processing system is operated in a second mode; and
- a controller to control the movement arrangement to independently move the first and second molds when the glass processing system is operated in the first mode, and to move the third mold when the glass processing system is operated in the second mode;
wherein the heating station includes a conveyor system for conveying the glass sheets longitudinally along a plane of conveyance, wherein when the glass processing system is operated in the first mode, the conveyor system is operable to convey a first set of the glass sheets so that a center of each glass sheet of the first set is positioned on a first side of a longitudinal centerline of the heating station, and when the glass processing system is operated in the second mode, the conveyor system is operable to convey a second set of the glass sheets so that a center of each glass sheet of the second set is positioned on an opposite second side of the longitudinal centerline of the heating station.

\* \* \* \* \*